Jan. 26, 1954
S. R. FERGUSON
2,667,368
CLAMP FOR NONMETALLIC SHEATHED CABLES
Filed Sept. 14, 1951
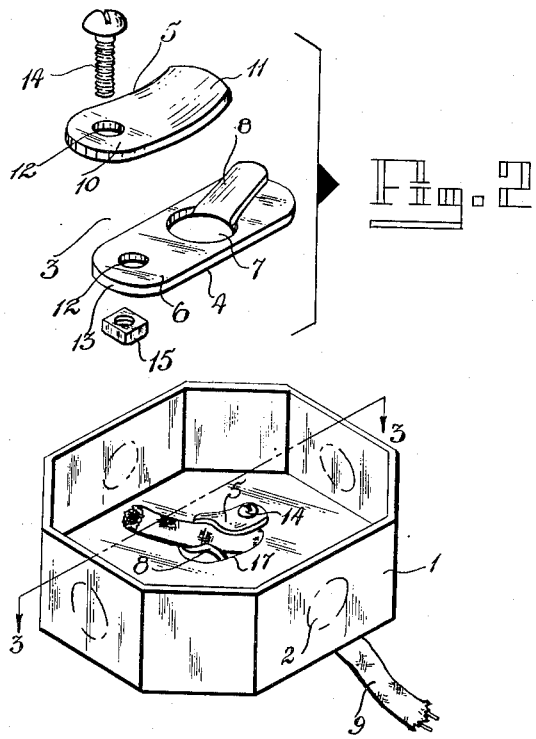
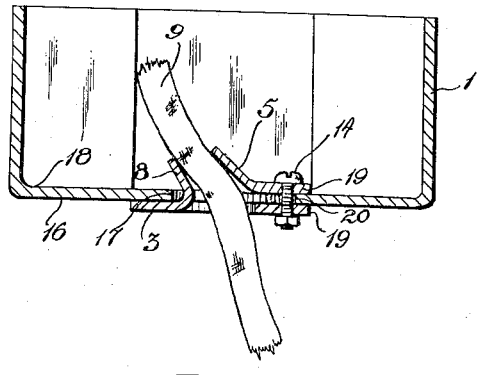
INVENTOR:
STANLEY R. FERGUSON
BY Fetherstonhaugh & Kent.
HIS ATT'YS:

Patented Jan. 26, 1954

2,667,368

UNITED STATES PATENT OFFICE 2,667,368

CLAMP FOR NONMETALLIC SHEATHED CABLES

Stanley R. Ferguson, Abernethy, Saskatchewan, Canada

Application September 14, 1951, Serial No. 246,663

3 Claims. (Cl. 285—6.5)

My invention relates to new and useful improvements in cable clamps for non-metallic sheathed cables and, in particular, for clamps for such cables where they are adapted to pass through a junction box or switch box or the like, an object of my invention being to provide a device of the character herewithin described which may readily be placed in position during the wiring of a structure.

A further object of my invention is to provide a device of the character herewithin described the use of which permits the cable to be passed into the box and then be pulled tight to take up any slack in the cable, it not being necessary at that point to tighten the clamp due to the non-slip arrangement thereof. This means that an operator may pass the end of a relatively long cable into the junction or switch box and take up any slack within the length of cable from the last point of connection until sufficient tension is in the cable without the necessity of having to support the weight of said cable which can be considerable, while tightening the clamp finally.

Another object of my invention is to provide a device of the character herewithin described which permits the cable to be fed into the box at an angle of approximately 45° to the plane of the surface of the box through which it is passing thereby eliminating substantially the relatively large radius of cable necessary when said cable has to enter at right angles as is the practice with conventional clamps thereby enabling a considerable saving of space to be made, an important factor when there are a plurality of cables entering a junction box in a restricted area.

A yet further object of my invention is to provide a device of the character herewithin described which is economical in manufacture, simple in construction, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which—

Figure 1 is a perspective view of a conventional junction box with a cable entering therein and being held in position by my device.

Figure 2 is a perspective exploded view of my clamp per se.

Figure 3 is a section substantially along the line 3—3 of Figure 1, it being noted that the aperture within the junction box through which the cable is passing has been exaggerated for clarity.

In the drawings like characters of reference indicate corresponding parts in the different figures.

Proceeding now to describe my invention in detail, it will be seen upon reference to the accompanying drawings that I have illustrated a conventional junction box 1 being hexagonal in configuration and being provided with a plurality of knock-out discs 2 so that a plurality of cables can be fed into the box for joining or other purposes. However, it is to be clearly understood that although I have illustrated a junction box, the same clamp hereinafter to be described can be used in exactly the same fashion to hold a cable passing, for example, a switch box.

My clamp collectively designated 3 is best shown in Figure 2 of the accompanying drawings and comprises two main components namely a base portion collectively designated 4, and a clamping tongue collectively designated 5. The base portion 4 is fabricated from a substantially rectangular blank 6 and is provided with a centrally disposed aperture 7, the portion being displaced to form the aperture being thereafter preformed to provide what I define as a cable supporting saddle 8 which remains attached to the edge of the aperture and extends upwardly and rearwardly from the blank.

This tongue is pre-formed into a concavo-convex cross-sectional configuration to act as a seating or bearing for the portion of a non-metallic sheathed cable 9 which may be held thereby.

The aforementioned clamping tongue 5 is also formed from a substantially rectangular blank of slightly smaller dimensions than the blank 6 and comprises an inner end 10 and an outer, upwardly curved end 11. This upwardly curved end 11 is then preformed also in a concavo-convex cross-sectional configuration and complements the aforementioned saddle 8 when in position as clearly shown in the drawings.

Apertures 12 are formed within the inner end of the tongue 5 and the inner end 13 of the base portion 4 so that the two portions may be connected together by means of a bolt 14 and a corresponding nut 15. However, it will be appreciated that, if desired, the aperture 12 within the base portion may be screw-threaded directly to receive the bolt 14 thus eliminating the necessity for the nut 15.

Reference to Figure 3 will show the operation of my device by which it will be seen that the base portion is placed against the outside 16 of the box 1 with the saddle 8 extending through the aperture 17 formed within the box. The clamping tongue 5 is then positioned upon the inside 18 of the box with the aperture 12 in registration with the aperture 12 in the base portion so that bolt 14 can be passed therethrough. It will be observed that this bolt also passes through the aperture 17 within the box and that the clamp is positioned so that tightening of the bolt 14 will cause the inner extremities 19 of the tongue 5 and the base portion 4 to clamp upon the edge 20 of the aperture 17.

In operation, the clamp is positioned within the desired aperture in the box 1 and the bolt 14 tightened sufficiently to hold the clamp lightly in position. The clamp is then rotated within the aperture 17 to align the saddle 8 and the tongue 5 with the run of the cable which may then be fitted through the aperture 7 within the base portion, through the aperture 17 within the box, and between the tongue 5 and the saddle 8 and it will be noted that there is a non-reversing action of the clamp which prevents the cable from sliding back once it has been pulled tight.

When the cable is in the desired position the bolt 14 can be tightened finally thus causing the tongue 5 to bear down upon the cable 9 thus pressing it within the saddle 8 and clamping it firmly in position as well as causing the two portions of the clamp also to be held firmly in position within the box.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A clamp for holding non-metallic sheathed cables in position within a wall of a junction or switch box or the like, comprising in combination a base portion, and a clamping tongue detachably secured thereto, said base portion having a cable supporting saddle formed thereon, said base portion being adapted to lie on one side of the wall of the associated box with said saddle extending through an aperture therein, said tongue adapted to be on the other side of the wall of said box coacting with said base portion to clamp the associated cable in position, said base portion taking the form of an apertured plate, said saddle extending upwardly and outwardly from the edge of said aperture, said saddle being concavo-convex in cross-section thereby acting as a bearing surface for said cable.

2. The device according to claim 1 in which said tongue is formed from a substantially rectangular piece of material being curved upwardly at one end thereof when viewed in side elevation, said curved end being concavo-convex in cross-sectional configuration.

3. The device according to claim 1 in which said clamping tongue is formed from a substantially rectangular piece of material being curved upwardly at one end thereof when viewed in side elevation, said curved end being concavo-convex in cross-sectional configuration, and screw-threaded fastening means extending through the other end of said tongue and said base portion so that said ends may be clamped upon the edge of the aperture within said box.

STANLEY R. FERGUSON.

References Cited in the file of this patent
UNITED STATES PATENTS

| Number | Name | Date |
|---|---|---|
| 1,524,341 | Davis | Jan. 27, 1925 |
| 1,740,765 | Burnett | Dec. 24, 1929 |